(12) United States Patent
Li et al.

(10) Patent No.: US 12,414,004 B2
(45) Date of Patent: Sep. 9, 2025

(54) METHOD, DEVICE, AND SYSTEM FOR LIMITING DATA RATE OF NETWORK SLICE USER, AND STORAGE MEDIUM

(71) Applicant: CHINA TELECOM CORPORATION LIMITED, Beijing (CN)

(72) Inventors: Mingxue Li, Beijing (CN); Biao Long, Beijing (CN); Peirong Xie, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 298 days.

(21) Appl. No.: 18/019,641

(22) PCT Filed: Jul. 28, 2021

(86) PCT No.: PCT/CN2021/108839
§ 371 (c)(1),
(2) Date: Feb. 3, 2023

(87) PCT Pub. No.: WO2022/028282
PCT Pub. Date: Feb. 10, 2022

(65) Prior Publication Data
US 2023/0319622 A1    Oct. 5, 2023

(30) Foreign Application Priority Data
Aug. 6, 2020   (CN) .......................... 202010783278.6

(51) Int. Cl.
*H04W 28/02* (2009.01)
*H04M 15/00* (2006.01)

(52) U.S. Cl.
CPC ....... *H04W 28/0268* (2013.01); *H04M 15/66* (2013.01); *H04W 28/0257* (2013.01)

(58) Field of Classification Search
CPC ......... H04W 28/0268; H04W 28/0257; H04W 28/22; H04M 15/66; H04L 47/22;
(Continued)

(56) References Cited

U.S. PATENT DOCUMENTS

| 2019/0182875 A1 | 6/2019 | Talebi Fard et al. |
| 2021/0084582 A1 | 3/2021 | Li |

(Continued)

FOREIGN PATENT DOCUMENTS

| CN | 103648088 A | 3/2014 |
| CN | 110351890 A | 10/2019 |

(Continued)

OTHER PUBLICATIONS

International Search Report issued on Sep. 30, 2021 in corresponding Application No. PCT/CN2021/108839; 5 pages.

(Continued)

*Primary Examiner* — Abdullahi Ahmed
(74) *Attorney, Agent, or Firm* — Andrew M. Calderon; Calderon Safran & Wright P.C.

(57) ABSTRACT

The present disclosure relates to a method, device, and system for limiting a data rate of a network slice user, and a storage medium. The method for limiting the data rate of the network slice user includes: performing, by a policy control function network element, a unified rate limit on a guaranteed bit rate (GBR) data stream and a non-guaranteed bit rate (non-GBR) data stream of the network slice user in case where a user equipment initiates a slice data session establishment request or a slice data session modification request.

17 Claims, 5 Drawing Sheets

Performing a unified rate limit on a GBR data stream and a non-GBR data stream of the network slice user in the case where the user equipment initiates a slice data session establishment request or a slice data session modification request  — 11

(58) Field of Classification Search
CPC ..... H04L 47/822; H04L 47/828; H04L 47/78; H04L 41/0894
See application file for complete search history.

(56) References Cited

U.S. PATENT DOCUMENTS

| | | | |
|---|---|---|---|
| 2021/0211970 A1* | 7/2021 | Lee | H04L 47/20 |
| 2022/0132375 A1* | 4/2022 | Khirallah | H04W 12/106 |
| 2022/0217593 A1* | 7/2022 | Yang | H04W 36/06 |
| 2022/0256395 A1* | 8/2022 | Sun | H04W 48/12 |
| 2022/0286895 A1* | 9/2022 | Lee | H04W 28/0257 |
| 2022/0417802 A1 | 12/2022 | Ying et al. | |
| 2023/0072593 A1* | 3/2023 | Ii | H04W 28/0827 |

FOREIGN PATENT DOCUMENTS

| | | |
|---|---|---|
| CN | 110366132 A | 10/2019 |
| CN | 110662261 A | 1/2020 |
| EP | 3793248 A1 | 3/2021 |
| WO | 2019216725 A1 | 11/2019 |

OTHER PUBLICATIONS

Huawei et al. "KI#3, new Sol: Solution on limitation of data rate per Network Slice in UL and DL per UE", 3GPP TSG-WG SA2 Meeting #139E e-meeting S2-2004577,Jun. 8, 2020 (Jun. 8, 2020).
International Preliminary Report on Patentability issued on Feb. 7, 2023 in corresponding Application No. PCT/CN2021/108839; 4 pages.
Written Opinion of ISA issued on Sep. 30, 2021 in corresponding Application No. PCT/CN2021/108839; 3 pages.
Extended European Search Report issued on Nov. 28, 2023 in corresponding EP Application No. 21854582.0; 14 pages.
3rd Generation Partnership Project; Technical Specification Group Services and System Aspects; Study on enhancement of network slicing; Phase 2 (Release 17); 3G pp TR 23 ■ 700-40 V0.4.0 (Jun. 2020) 143 pages.
China Telecom—Solution for KI#3 on limitation of data rate per network slice in UL and DL per UE; SA WG2 Meeting #139—eMeeting, Jun. 1-12, 2020; 4 pages.
Huawei, HiSilicon, ZTE, Apple, Nokia, Nokia Shanghai Bell—3GPP TSG-WG SA2 Meeting #139E e-meeting—Elbonia, Jun. 1-12, 2020; 7 pages.
Huawei et al. "KI#3, new Sol: Solution on limitation of data rate per Network Slice in UL and DL per UE", 3GPP TSG-WG SA2 Meeting #139E e-meeting S2-2004577, (Jun. 8, 2020); 7 pages.
China Telecom, "Solution for KI#3 on limitation of data rate per network slice in UL and DL per UE", SA WG2 Meeting #139 eMeeting S2-2004009, Jun. 1-12, 2020, 7 Pages.
China Telecom, "Solution update for KI#3 on limitation of data rate per network slice in UL and DL per UE", SA WG2 Meeting #140 eMeeting S2-2006508 (revision of S2-2005213) , Aug. 19-Sep. 2, 2020, 6 Pages.
Ericsson, "Handling of maximum supported data rate per UE for integrity protection", 3GPP TSG-SA WG2 Meeting #127-Bis S2-186100, May 28-Jun. 1, 2018, 4 Pages.
Japanese Office Action dated May 15, 2024 in JP Application No. 2023-507928, with English Translation, 8 pages.
Sophia Antipolis, "Study on enhancement of network slicing", Technical Report, 3GPP TR 23.700-40 V1.0.0 (Sep. 2020), Release 17, 2020, 68 pages.
Chinese Office Action in related CN Application No. 202010783278.6 dated Mar. 29, 2024, 15 pages.

* cited by examiner

Performing a unified rate limit on a GBR data stream and a non-GBR data stream of the network slice user in the case where the user equipment initiates a slice data session establishment request or a slice data session modification request — 11

Fig. 1

Obtaining the rate sum of all current up-link data streams of a terminal activation state user plane in a network slice and the rate sum of all current down-link data streams of the terminal activation state user plane in the network slice — 21

Comparing, by the policy control function network element, the rate sum of all the current up-link data streams with the maximum up-link rate of a terminal in the network slice, and comparing the rate sum of all the current down-link data streams with the maximum down-link rate of a terminal in the network slice — 22

Performing, by the policy control function network element, the unified rate limit on the GBR data stream and the non-GBR data stream of the network slice user according to the comparison results — 23

Fig. 2

METHOD, DEVICE, AND SYSTEM FOR LIMITING DATA RATE OF NETWORK SLICE USER, AND STORAGE MEDIUM

CROSS-REFERENCE TO RELATED APPLICATIONS

The present application is based on and claims priority to China Patent Application No. CN202010783278.6 filed on Aug. 6, 2020, the disclosure of which is incorporated by reference herein in its entirety.

TECHNICAL FIELD

The present disclosure relates to the field of mobile communication, in particular to a method, device and system for limiting a data rate of a network slice user, and a storage medium.

BACKGROUND

The network slice technology is one of the key properties of the 5G mobile communication system. In the network slice technology, a plurality of different logical networks are virtualized on a unified network infrastructure by using the virtualization technology, to meet different service and user demands respectively.

SUMMARY

According to one aspect of the present disclosure, a method for limiting a data rate of a network slice user is provided. The method comprises: performing, by a policy control function network element, a unified rate limit on a guaranteed bit rate (GBR) data stream and a non-guaranteed bit rate (non-GBR) data stream of the network slice user in case where a user equipment initiates a slice data session establishment request or a slice data session modification request.

In some embodiments of the present disclosure, the performing, by a policy control function network element, a unified rate limit on a GBR data stream and a non-GBR data stream of the network slice user, comprises: obtaining, by the policy control function network element, the rate sum of all current up-link data streams of a terminal activation state user plane in a network slice and the rate sum of all current down-link data streams of the terminal activation state user plane in the network slice; comparing, by the policy control function network element, the rate sum of all the current up-link data streams with the maximum up-link rate of a terminal in the network slice, and comparing the rate sum of all the current down-link data streams with the maximum down-link rate of a terminal in the network slice; and performing, by the policy control function network element, the unified rate limit on the GBR data stream and the non-GBR data stream of the network slice user according to the comparison results of the rate sum of all the current up-link data streams and the maximum up-link rate of the terminal in the network slice, and the rate sum of all the current down-link data streams and the maximum down-link rate of the terminal in the network slice.

In some embodiments of the present disclosure, the unified rate limit on the GBR data stream and the non-GBR data stream of the network slice user according to the comparison results of the rate sum of all the current up-link data streams and the maximum up-link rate of the terminal in the network slice, and the rate sum of all the current down-link data streams and the maximum down-link rate of the terminal in the network slice, comprises: subtracting, by the policy control function network element, the GBR rate sum of all the current up-link GBR data streams from the maximum up-link rate of the terminal to get a first value, and taking the first value as a rate range of up-link non-GBR data streams, in the case where the rate sum of all the current up-link data streams is less than or equal to the maximum up-link rate of the terminal in the network slice and the rate sum of all the current down-link data streams is less than or equal to the maximum down-link rate of the terminal in the network slice; and sending, by the policy control function network element, the rate range of the up-link non-GBR data streams through a session management function network element to a user equipment or a user plane function network element to perform.

In some embodiments of the present disclosure, the performing, by the policy control function network element, the unified rate limit on the GBR data stream and the non-GBR data stream of the network slice user according to the comparison results of the rate sum of all the current up-link data streams and the maximum up-link rate of the terminal in the network slice, and the rate sum of all the current down-link data streams and the maximum down-link rate of the terminal in the network slice, further comprises: subtracting, by the policy control function network element, the GBR rate sum of all the current down-link GBR data streams from the maximum down-link rate of the terminal to get a second value, and taking the second value as a rate range of up-link non-GBR data streams, in the case where the rate sum of all the current up-link data streams is less than or equal to the maximum up-link rate of the terminal in the network slice and the rate sum of all the current down-link data streams is less than or equal to the maximum down-link rate of the terminal in the network slice; and sending, by the policy control function network element, the rate range of the down-link non-GBR data stream rates through the session management function network element to the user plane function network element to perform.

In some embodiments of the present disclosure, the performing, by the policy control function network element, the unified rate limit on the GBR data stream and the non-GBR data stream of the network slice user according to the comparison results of the rate sum of all the current up-link data streams and the maximum up-link rate of the terminal in the network slice, and the rate sum of all the current down-link data streams and the maximum down-link rate of the terminal in the network slice, comprises: taking, by the policy control function network element, an up-link GBR data stream with an address resolution protocol priority lower than a predetermined priority as an up-link GBR data stream required to be ceased in the case where the rate sum of all the current up-link data streams is greater than the maximum up-link rate of the terminal in the network slice and there is a new GBR data stream, to ensure that the rate sum of all the current up-link data streams is less than or equal to the maximum up-link rate of the terminal in the network slice; subtracting, by the policy control function network element, the GBR rate sum of all the current up-link GBR data streams from the maximum down-link rate of the terminal to get a first value, and taking the first value as a rate range of up-link non-GBR data streams; informing, by the policy control function network element, a wireless access network side device to cease the up-link GBR data stream with the address resolution protocol priority lower than the preset priority through a session management function network element; and sending, by the policy control function network element, the rate range of the up-link non-GBR data streams through the session management function network element to a user equipment or a user plane function network element to perform.

In some embodiments of the present disclosure, the slice data session establishment request or the slice data session modification request comprises a terminal capability identifier, wherein the terminal capability identifier is configured to indicate whether the user equipment supports a function of limiting a slice session rate of the non-GBR data stream.

In some embodiments of the present disclosure, the sending, by the policy control function network element, the rate range of the up-link non-GBR data streams to a user equipment or a user plane function network element to perform through a session management function network element comprises: sending, by the policy control function network element, the rate range of the up-link non-GBR data streams to the session management function network element, wherein the session management function network element is configured to determine whether the user equipment supports the function of limiting the slice session rate according to the terminal capability identifier, send the rate range of the up-link non-GBR data streams to the user equipment to perform in the case where the user equipment supports the function of limiting the slice session rate, and send the rate range of the up-link non-GBR data streams to the user plane function network element to perform in the case where the user equipment does not support the function of limiting the slice session rate.

In some embodiments of the present disclosure, the performing, by the policy control function network element, the unified rate limit on the GBR data stream and the non-GBR data stream of the network slice user according to the comparison results of the rate sum of all the current up-link data streams and the maximum up-link rate of the terminal in the network slice, and the rate sum of all the current down-link data streams and the maximum down-link rate of the terminal in the network slice, comprises: taking, by the policy control function network element, a down-link GBR data stream with an address resolution protocol priority lower than a predetermined priority as a down-link GBR data stream required to be ceased in the case where the rate sum of all the current down-link data streams is greater than the maximum down-link rate of the terminal in the network slice and there is a new GBR data stream, to ensure that the rate sum of all the current down-link data streams is less than or equal to the maximum down-link rate of the terminal in the network slice; subtracting, by the policy control function network element, the GBR rate sum of all the current down-link GBR data streams from the maximum down-link rate of the terminal to get a second value, and taking the second value as a rate range of down-link non-GBR data streams; informing, by the policy control function network element, a wireless access network side device to cease the down-link GBR data stream with the address resolution protocol priority lower than the predetermined priority through a session management function network element; and sending, by the policy control function network element, the rate range of the down-link non-GBR data streams through the session management function network element to a user plane function network element to perform.

According to another aspect of the present disclosure, a policy control function network element is provided. The network element comprises: a rate limiting module configured to perform a unified rate limit on a guaranteed bit rate (GBR) data stream and a non-guaranteed bit rate (non-GBR) data stream of the network slice user in case where a user equipment initiates a slice data session establishment request or a slice data session modification request.

In some embodiments of the present disclosure, the policy control function network element is configured to perform the operation of implementing the method for limiting a data rate of a network slice user according to any one of the above-described embodiments.

According to another aspect of the present disclosure, a policy control function network element is provided. The network element comprises: a memory configured to store instructions; and a processor configured to execute the instructions, so that the policy control function network element is configured to perform the operation of implementing the method for limiting a data rate of a network slice user according to any one of the above-described embodiments.

According to another aspect of the present disclosure, a system for limiting a data rate of a network slice user is provided. The system comprises the policy control function network element according to any one of the above-described embodiments.

In some embodiments of the present disclosure, the system for limiting a data rate of a network slice user further comprises: a session management function network element configured to request a session management policy from the policy control function network element in the case where a user equipment initiates the slice data session establishment request or the slice data session modification request; receive the session management policy sent by the policy control function network element, wherein the session management policy comprises a rate range of up-link non-GBR data streams, a rate range of down-link non-GBR data streams, and a ceasing instruction of a down-link GBR data stream or an up-link GBR data stream; send the rate range of the up-link non-GBR data streams to a user equipment or a user plane function network element to perform; send the rate range of the down-link non-GBR data streams to the user plane function network element to perform; and inform a wireless access network side device to cease the up-link GBR data stream or the down-link GBR data stream with an address resolution protocol priority lower than a predetermined priority.

In some embodiments of the present disclosure, the system for limiting a data rate of a network slice user further comprises: a user equipment configured to send the slice data session establishment request or the slice data session modification request, wherein the slice data session establishment request or the slice data session modification request comprises a terminal capability identifier configured to indicate whether the user equipment supports a function of limiting a slice session rate of the non-GBR data stream; and perform a rate range of up-link non-GBR data streams.

In some embodiments of the present disclosure, the system for limiting a data rate of a network slice user further comprises: a user plane function network element configured to perform at least one of a rate range of up-link non-GBR data streams or a rate range of down-link non-GBR data streams.

According to another aspect of the present disclosure, a computer-readable storage medium is provided, wherein the computer-readable storage medium has computer instructions stored thereon that, when executed by a processor, implements the method for limiting a data rate of a network slice user according to any one of the above-described embodiments.

BRIEF DESCRIPTION OF THE ACCOMPANYING DRAWINGS

In order to more explicitly explain the embodiments of the present disclosure or the technical solutions in the related art, the accompanying drawings required to be used in the description of the embodiments or the related art will be briefly introduced below. It is apparent that, the accompanying drawings illustrated below are merely some of the embodiments of the present disclosure. For those of ordinary skill in the art, other accompanying drawings may also be obtained according to these accompanying drawings on the premise that no inventive effort is involved.

FIG. 1 is a schematic view of some embodiments of the method for limiting a data rate of a network slice user according to the present disclosure.

FIG. 2 is a schematic view of other embodiments of the method for limiting a data rate of a network slice user according to the present disclosure.

DETAILED DESCRIPTION

Figure 3:
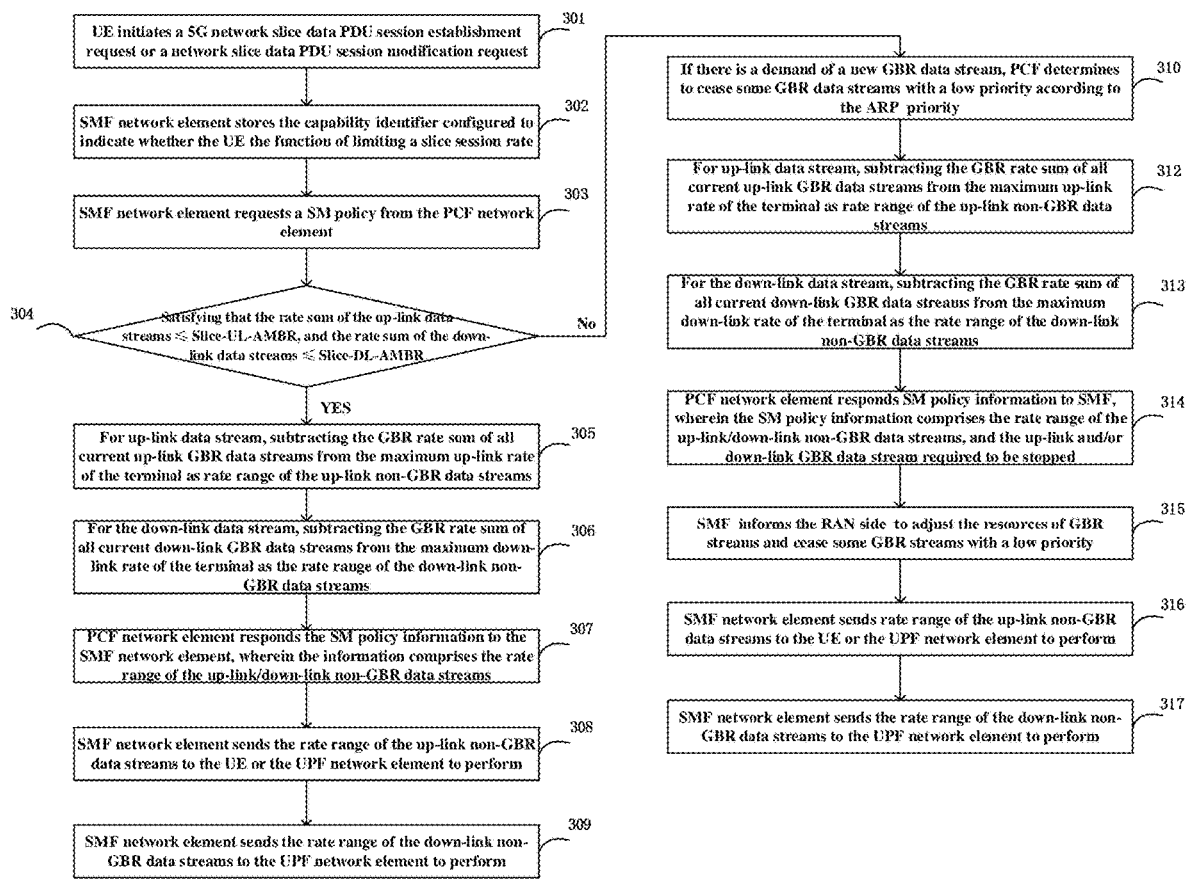
FIG. 3 is a schematic view of still other embodiments of the method for limiting a data rate of a network slice user according to the present disclosure.

The technical solution in the embodiments of the present disclosure will be explicitly and completely described below in conjunction with the accompanying drawings in the embodiments of the present disclosure. Apparently, the embodiments described are merely some of the embodiments of the present disclosure, rather than all of the embodiments. The following descriptions of at least one exemplary embodiment which are in fact merely illustrative, shall by no means serve as any delimitation on the present disclosure as well as its application or use. On the basis of the embodiments of the present disclosure, all the other embodiments obtained by those skilled in the art on the premise that no inventive effort is involved shall fall into the protection scope of the present disclosure.

Unless otherwise specified, the relative arrangements, numerical expressions and numerical values of the components and steps expounded in these examples shall not limit the scope of the present disclosure.

At the same time, it should be understood that, for ease of description, the dimensions of various parts shown in the accompanying drawings are not drawn according to actual proportional relations.

The techniques, methods, and apparatuses known to those of ordinary skill in the relevant art might not be discussed in detail. However, the techniques, methods, and apparatuses shall be considered as a part of the granted description where appropriate.

Among all the examples shown and discussed here, any specific value shall be construed as being merely exemplary, rather than as being restrictive. Thus, other examples in the exemplary embodiments may have different values.

It is to be noted that: similar reference signs and letters present similar items in the following accompanying drawings, and therefore, once an item is defined in one accompanying drawing, it is necessary to make further discussion on the same in the subsequent accompanying drawings.

The inventors have discovered through their research that: the new demand set forth in the research report TR 23.700-40 of 3GPP R17 (5G evolution standard) is the demand directed to limiting a data rate of a network slice user; and a corresponding solution is absent in the related art.

In view of at least one of the above-described technical problems, the present disclosure provides a method, device and system for limiting a data rate of a network slice user, and a storage medium, which can implement a rate limit on user data in a network slice dimension.

FIG. 1 is a schematic view of some embodiments of the method for limiting a data rate of a network slice user according to the present disclosure. Preferably, the present embodiment may be performed by the system for limiting a data rate of a network slice user according to the present disclosure or the policy control function network element according to the present disclosure. The method comprises the following step 11.

In step 11, in the case where a user equipment initiates a slice data session establishment request or a slice data session modification request, a PCF (Policy Control Function) network element performs a unified rate limit on the a guaranteed bit rate (GBR) data stream and a non-guaranteed bit rate (non-GBR) data stream of the network slice user.

The above-described embodiments of the present disclosure may implement limiting a user data rate in a network slice dimension.

FIG. 2 is a schematic view of other embodiments of the method for limiting a data rate of a network slicing user according to the present disclosure. Preferably, the present embodiment may be performed by the system for limiting a data rate of a network slice user according to the present disclosure or the policy control function network element according to the present disclosure. The method for limiting a data rate of a network slice user (i.e., the step 11 in the embodiment of FIG. 1) according to the present disclosure may comprise at least one step from 21 to 23.

In step 21, in the case where the user equipment initiates a slice data session establishment request or a slice data session modification request, the policy control function network element obtains the rate sum of all current up-link data streams of a terminal activation state user plane in a network slice and the rate sum of all current down-link data streams of the terminal activation state user plane in the network slice.

In step 22, the policy control function network element compares the rate sum of all the current up-link data streams with the maximum up-link rate of the terminal in the network slice, and compares the rate sum of all the current down-link data streams with the maximum down-link rate of the terminal in the network slice respectively.

In step 23, the policy control function network element performs a unified rate limit on the GBR data stream and the non-GBR data stream of the network slice user according to the comparison results of the rate sum of all the current up-link data streams and the maximum up-link rate of the terminal in the network slice, and the rate sum of all the current down-link data streams and the maximum down-link rate of the terminal in the network slice.

FIG. 3 is a schematic view of still other embodiments of the method for limiting a data rate of a network slicing user according to the present disclosure. Preferably, the present embodiment may be performed by the system for limiting a data rate of a network slice user according to the present disclosure or the policy control function network element according to the present disclosure. The method for limiting a data rate of a network slice user according to the present disclosure may comprise at least one step from 301 to 317.

In step 301, the UE (User Equipment) initiates a 5G network slice data PDU (Protocol Data Unit) session establishment request or a network slice data PDU session modification request, wherein the slice data session establishment request or the slice data session modification request comprises an terminal capability identifier, wherein the terminal capability identifier is configured to indicate whether the user equipment supports the function of limiting a slice session rate of the non-GBR data stream.

In step 302, the SMF (Session Management Function) network element stores the capability identifier configured to indicate whether the UE supports the function of limiting a slice session rate.

In step 303, the SMF network element requests a SM (Session Management) policy from the PCF network element.

In step 304, the PCF network element the rate sum of all the current up-link data streams with the maximum up-link rate of the terminal in the network slice, and compares the rate sum of all the current down-link data streams with the maximum down-link rate of the terminal in the network slice respectively. If the rate sum of all the current up-link data streams is less than or equal to the maximum up-link rate of the terminal in the network slice, and the rate sum of all the current down-link data streams is less than or equal to the maximum down-link rate of the terminal in the network slice, step 305 is performed. Otherwise, if the rate sum of all the current up-link data streams is greater than the maximum up-link rate of the terminal in the network slice, or the rate sum of all the current down-link data streams is greater than the maximum down-link rate of the terminal in the network slice, step 310 is performed.

In some embodiments of the present disclosure, a UDR (Unified Data Repository) device of the PCF network element is stored with the maximum up-link rate of the terminal and the maximum down-link rate of the terminal in the network slice in advance.

In some embodiments of the present disclosure, two subscription parameters stored in the PCF (UDR) device are used: Slice-UL (up-link)-AMBR (Aggregate Maximum Bit Rate) and Slice-DL (down-link)-AMBR, which represent the maximum up-link rate of the terminal and the maximum down-link rate of the terminal in the network slice in the network slice respectively.

In step 305, for the up-link data stream, the PCF network element subtracts the GBR rate sum of all the current up-link GBR data streams from the maximum up-link rate of the terminal to get a first value, and takes the first value as the rate range of the up-link non-GBR data streams.

In some embodiments of the present disclosure, the step 305 may comprise that: the PCF network element subtracts the GBR rate sum of all the current active up-link GBR streams from the Slice-UL-AMBR to get a first value, and takes the first value as the rate range of the up-link non-GBR data streams.

In step 306, for the down-link data stream, the PCF network element subtracts the GBR rate sum of all the current down-link GBR data streams from the maximum down-link rate of the terminal to get a second value, and takes the second value as the rate range of the down-link non-GBR data streams.

In some embodiments of the present disclosure, the step 306 may comprise that: the PCF network element subtracts the GBR rate sum of all the current active downlink GBR streams from the Slice-DL-AMBR to get a second value, and takes the second value as the rate range of the down-link non-GBR data streams.

In step 307, the PCF network element responds the SM policy information to the SMF network element, wherein the SM policy information comprises the rate range of the up-link non-GBR data streams and the rate range of the down-link non-GBR data streams.

In step 308, the SMF network element sends the rate range of the up-link non-GBR data streams to the user equipment or the UPF (User Plane Function) network element to perform.

In some embodiments of the present disclosure, the step 308 may comprise at least one step from 3081 to 3083.

In step 3081, the session management function network element determines whether the user equipment supports the function of limiting the slice session rate according to the terminal capability identifier.

In step 3082, in the case where the user equipment supports the function of limiting the slice session rate, the session management function network element sends the rate range of the up-link non-GBR data streams to the user equipment to perform.

In step 3083, in the case where the user equipment does not support the function of limiting the slice session rate, the session management function network element sends the rate range of the up-link non-GBR data streams to the user plane function network element to perform.

In step 309, the session management function network element sends the rate range of the down-link non-GBR data streams to the user plane function network element to perform.

In step 310, if there is a demand of a new GBR data stream, the PCF determines to cease some GBR data streams with a low priority according to the ARP (Address Resolution Protocol) priority, to ensure that the rate sum of all the current up-link/down-link data streams will not exceed the Slice-UL/DL-AMBR.

In some embodiments of the present disclosure, the step 310 may comprise at least one step from 3101 to 3102.

In step 3101, the policy control function network element takes an up-link GBR data stream with an address resolution protocol priority lower than a predetermined priority as an up-link GBR data stream required to be ceased according to the address resolution protocol priority, in the case where the rate sum of all the current up-link data streams is greater than the maximum up-link rate of the terminal in the network slice and there is a new GBR data stream, to ensure that the rate sum of all the current up-link data streams is less than or equal to the maximum up-link rate of the terminal in the network slice.

In step 3102, the policy control function network element takes a down-link GBR data stream with an address resolution protocol priority lower than a predetermined priority as a down-link GBR data stream required to be ceased according to the address resolution protocol priority, in the case where the rate sum of all the current up-link data streams is greater than the maximum up-link rate of the terminal in the network slice and there is a new GBR data stream, to ensure that the rate sum of all the current down-link data streams is less than or equal to the maximum down-link rate of the terminal in the network slice.

In some embodiments of the present disclosure, the step 310 may comprise: firstly ceasing a GBR data stream with a low priority; then judging whether the rate sum of all the current up-link/down-link data streams exceeds the Slice-UL/DL-AMBR; determining that the GBR data stream with a low priority is the GBR data stream required to be stopped if the rate sum of all the current up-link/down-link data streams does not exceed Slice-UL/DL-AMBR; and in case where the rate sum of all the current up-link data streams is still greater than the Slice-UL-AMBR, or the rate sum of all the current down-link data streams is still greater than the Slice-DL-AMBR, ceasing another GBR data stream with a low priority until the rate sum of all the current up-link/down-link data streams does not exceed Slice-UL/DL-AMBR.

In step 312, for the up-link data stream, the PCF network element subtracts the GBR rate sum of all the current up-link GBR data streams from the maximum up-link rate of the terminal to get a first value, and takes the first value as the rate range of the up-link non-GBR data streams.

In step 313, for the down-link data stream, the PCF network element subtracts the GBR rate sum of all the current down-link GBR data streams from the maximum down-link rate of the terminal to get a second value, and takes the second value as the rate range of the down-link non-GBR data streams.

In step 314, the PCF network element responds the SM policy information to the SMF network element, wherein the SM policy information comprises the rate range of the up-link non-GBR data streams, the rate range of the down-link non-GBR data streams, and the up-link GBR data stream and/or down-link GBR data stream required to be stopped.

In step 315, the SMF network element informs the RAN (wireless access network) side device to adjust the resources of the GBR streams and cease some GBR streams with a low priority.

In some embodiments of the present disclosure, the step 315 may comprise that: the SMF network element informs the RAN side to adjust the resources of the GBR streams and cease some up-link GBR data streams and/or down-link GBR data streams with a low priority according to the SM policy information.

In step 316, the SMF network element sends the rate range of the up-link non-GBR data streams to the user equipment or the UPF network element to perform.

In some embodiments of the present disclosure, the step 316 is the same as or similar to the step 308, and the step 316 may also comprise steps 3081 to 3083.

In step 317, the session management function network element sends the rate range of the down-link non-GBR data streams the user plane function network element to perform.

Based on the method for limiting a data rate of a network slice user provided by the above-described embodiments of the present disclosure, it is possible to limit a user data rate directed to a network slice dimension, to realize a unified rate limit on the GBR and non-GBR data streams of the network slice terminal, which is conductive to a reasonable allocation of the network slice resources and an optimized transmission efficiency of the data streams in the network slice.

In the above-described embodiments of the present disclosure, it is possible to optimize the transmission efficiency of the data stream of the 5G network slice when the 5G network slice is deployed in the future.

Figure 4:
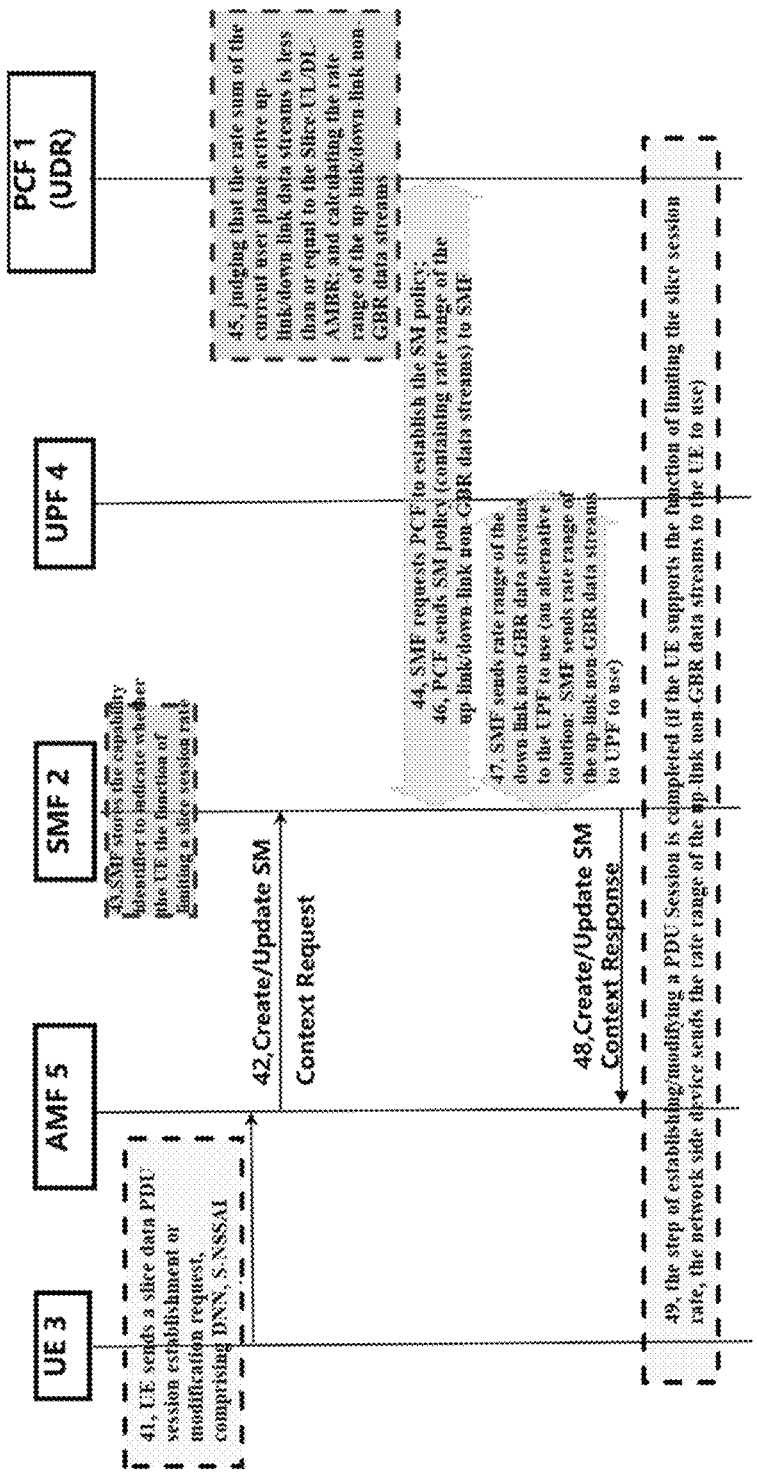
FIG. 4 is a schematic view of still other embodiments of the method for limiting a data rate of a network slice user according to the present disclosure.

FIG. 4 is a schematic view of still other embodiments of the method for limiting a data rate of a network slicing user according to the present disclosure. Preferably, the present embodiment may be performed by the system for limiting a data rate of a network slice user according to the present disclosure or the policy control function network element according to the present disclosure. The present embodiment is a scenario in which the PCF determines that the rate sum of the current user plane active up-link/down-link data streams does not exceed the Slice-UL/DL-AMBR (for example, the scenario of step 301 to step 309 in the embodiment of FIG. 3). The method for limiting a data rate of a network slice user according to the present disclosure may comprise at least one step from 41 to 49.

In step 41, the UE sends a slice data PDU session establishment request or a slice data PDU session modification request to an AMF (Access and Mobility Management Function) network element, wherein the slice data session establishment request or the slice data session modification request comprises an terminal capability identifier, a DNN (Data Network Name, Data network name) and S-NSSAI (single network slice selection assistance information), wherein the terminal capability identifier is configured to indicate whether the user equipment supports the function of limiting a slice session rate of the non-GBR data stream.

In step 42, the AMF network element sends a Create/Update SM Context Request (Create/Update Session Management Context Request) to the SMF network element.

In step 43, the SMF network element stores the capability identifier configured to indicate whether the UE supports the function of limiting a slice session rate.

In step 44, the SMF network element requests the PCF network element to establish the SM policy.

In step 45, the PCF network element determines that the rate sum of the current user plane active up-link/down-link data streams is less than or equal to the Slice-UL/DL-AMBR; and calculate the rate range of the up-link/down-link non-GBR data streams.

In some embodiments of the present disclosure, the step 45 may comprise at least one of step 451 and step 452.

In step 451, for the up-link data stream, the PCF network element subtracts the GBR rate sum of all the current up-link GBR data streams from the maximum up-link rate of the terminal to get a first value, and takes the first value as the rate range of the up-link non-GBR data streams.

In some embodiments of the present disclosure, the step 451 may comprise that: the PCF network element subtracts the GBR rate sum of all the current active up-link GBR streams from the Slice-UL-AMBR to get a first value, and takes the first value as the rate range of the up-link non-GBR data stream.

In step 452, for the down-link data stream, the PCF network element subtracts the GBR rate sum of all the current down-link GBR data streams from the maximum down-link rate of the terminal to get a second value, and takes the second value as the rate range of the down-link non-GBR data streams.

In some embodiments of the present disclosure, the step 452 may comprise that: the PCF network element subtracts the GBR rate sum of all the current active downlink GBR streams from the Slice-DL-AMBR to get a second value, and takes the second value as the rate range of the down-link non-GBR data streams.

In step 46, the PCF network element sends the SM policy (containing the rate range of the up-link/down-link non-GBR data streams) to the SMF network element.

In step 47, the SMF network element sends the rate range of the down-link non-GBR data streams to the UPF to use (an alternative solution of step 49: the SMF network element sends the rate range of the up-link non-GBR data streams to the UPF to use).

In step 48, the SMF network element responds a Create/Update SM Context Response (Create/Update Session Management Context Response) to the AMF network element.

In step 49, the step of establishing/modifying a PDU Session is completed (if the UE supports the function of limiting the slice session rate, the network side device sends the rate range of the up-link non-GBR data streams to the UE to use).

In the above-described embodiments of the present disclosure, in the case where the rate sum of the current up-link/down-link data streams does not exceed the Slice-UL/DL-AMRR, for the up-link data stream, the PCF subtracts the GBR rate sum of all the current up-link GBR streams from the Slice-UL-AMRR as the rate range of the up-link non-GBR data streams and sends the rate range of the up-link non-GBR data streams to the UE which supports the function of limiting a slice session rate to perform through the SMF (if the UE does not support this function, an alternative solution is that SMF sends the corresponding parameters to the UPF device to perform). For the down-link data stream, the PCF uses a similar method to obtain the rate range of the down-link non-GBR data streams and send the rate range of the down-link non-GBR data streams to the UPF device to perform.

Figure 5:
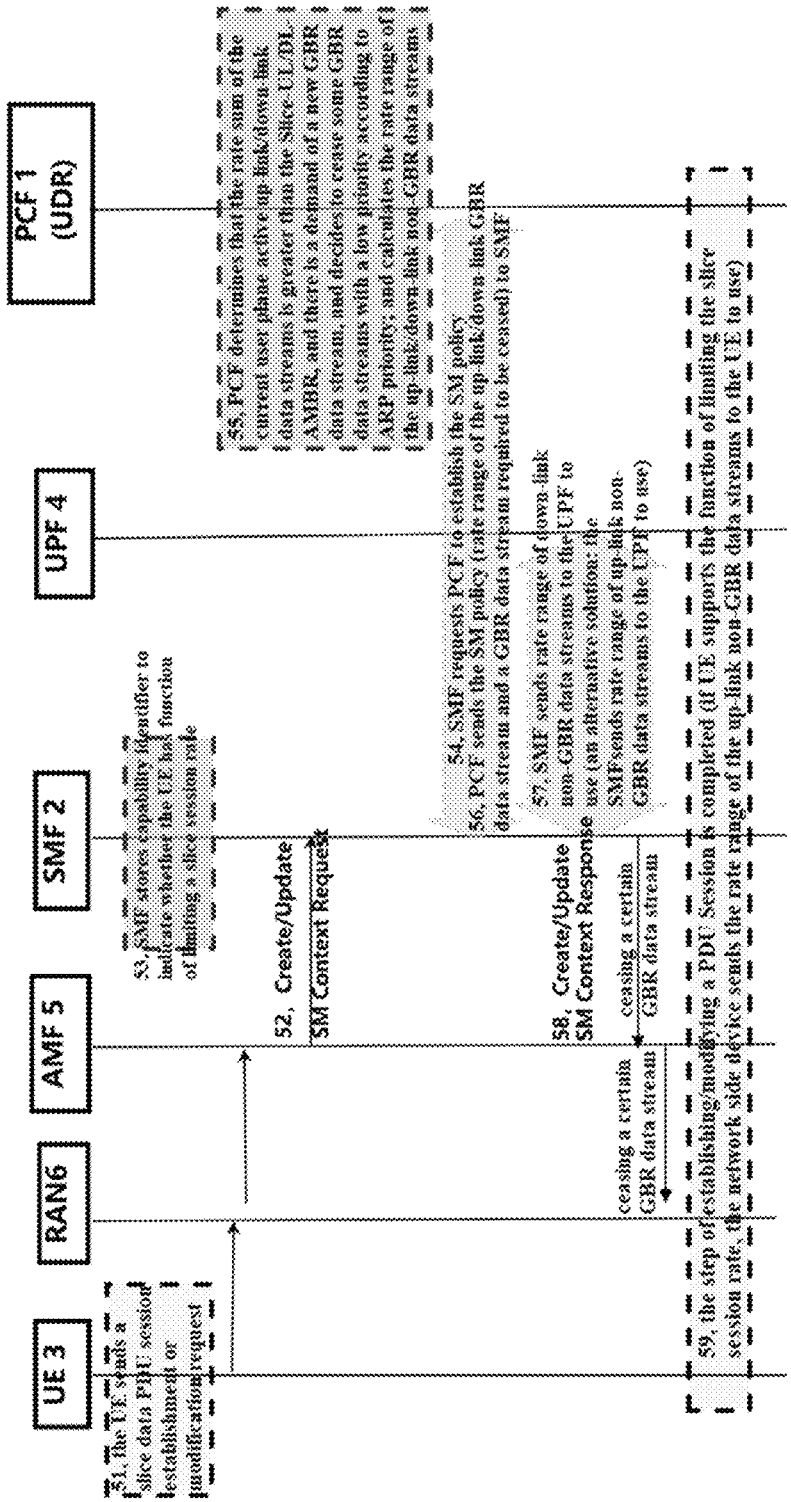
FIG. 5 is a schematic view of still other embodiments of the method for limiting a data rate of a network slice user according to the present disclosure.

FIG. 5 is a schematic view of still other embodiments of the method for limiting a data rate of a network slicing user according to the present disclosure. Preferably, the present embodiment may be performed by the system for limiting a data rate of a network slice user according to the present disclosure or the policy control function network element according to the present disclosure. The present embodiment is a scenario in which the PCF determines that the rate sum of the current user plane active up-link/down-link data streams does not exceed the Slice-UL/DL-AMBR (for example, the scenarios of steps 301 to 304 and steps 310 to 317 in the embodiment of FIG. 3). The method for limiting a data rate of a network slice user according to the present disclosure may comprise at least one of steps 51 to 59.

In step 51, the UE sends a slice data PDU session establishment request or a slice data PDU session modification request to an AMF (Access and Mobility Management Function) network element through the RAN, wherein the slice data session establishment request or the slice data session modification request comprises an terminal capability identifier, a DNN (Data Network Name) and S-NSSAI (single network slice selection assistance information), wherein the terminal capability identifier is configured to indicate whether the user equipment supports the function of limiting a slice session rate of the non-GBR data stream.

In step 52, the AMF network element sends a Create/Update SM Context Request (Create/Update Session Management Context Request) to the SMF network element.

In step 53, the SMF network element stores the capability identifier configured to indicate whether the UE supports the function of limiting a slice session rate.

In step 54, the SMF network element requests the PCF network element to establish the SM policy.

In step 55, the PCF network element determines that the rate sum of the current user plane active up-link/down-link data streams is greater than the Slice-UL/DL-AMBR, and there is a demand of a new GBR data stream, and decides to cease some GBR data streams with a low priority according to the ARP priority; and calculates the rate range of the up-link/down-link non-GBR data streams.

In some embodiments of the present disclosure, the step 55 may comprise at least one of step 551 to step 553.

In step 551, the policy control function network element takes a down-link GBR data stream with an address resolution protocol priority lower than a predetermined priority as a down-link GBR data stream required to be ceased according to the address resolution protocol priority in the case where the rate sum of all the current down-link data streams is greater than the maximum up-link rate of the terminal in the network slice and there is a new GBR data stream, to ensure that the rate sum of all the current down-link data streams is less than or equal to the maximum down-link rate of the terminal in the network slice.

In some embodiments of the present disclosure, the step 551 may comprise: firstly ceasing a GBR data stream with a low priority; then judging whether the rate sum of all the current up-link/down-link data streams exceeds the Slice-UL/DL-AMBR; determining that the GBR data stream with a low priority is the GBR data stream required to be stopped if the rate sum of all the current up-link/down-link data streams does not exceed Slice-UL/DL-AMBR; and in case where the rate sum of all the current up-link data streams is still greater than the Slice-UL-AMBR, or the rate sum of all the current down-link data streams is still greater than the Slice-DL-AMBR, ceasing another GBR data stream with a low priority until the rate sum of all the current up-link/down-link data streams does not exceed Slice-UL/DL-AMBR.

In step 552, for the up-link data stream, the PCF network element subtracts the GBR rate sum of all the current up-link GBR data streams from the maximum up-link rate of the terminal to get a first value, and takes the first value as the rate range of the up-link non-GBR data streams.

In some embodiments of the present disclosure, the step 552 may comprise that: the PCF network element subtracts the GBR rate sum of all the current active up-link GBR streams from the Slice-UL-AMBR to get a first value, and takes the first value as the rate range of the up-link non-GBR data streams.

In step 553, for the down-link data stream, the PCF network element subtracts the GBR rate sum of all the current down-link GBR data streams from the maximum down-link rate of the terminal to get a second value, and takes the second value as the rate range of the down-link non-GBR data streams.

In some embodiments of the present disclosure, the step 553 may comprise that: the PCF network element subtracts the GBR rate sum of all the current active downlink GBR streams from the Slice-DL-AMBR to get a second value, and takes the second value as the rate range of the down-link non-GBR data streams.

In step 56, the PCF network element sends the SM policy (containing the rate range of the up-link GBR data stream and/or down-link GBR data stream and the up-link/down-link non-GBR data stream required to be ceased) to the SMF network element.

In step 57, the SMF network element sends the rate range of the down-link non-GBR data streams to the UPF to use (an alternative solution of step 59: the SMF network element sends the rate range of the up-link non-GBR data streams to the UPF to use).

In step 58, the SMF network element responds a Create/Update SM Context Response (Create/Update Session Management Context Response) to the AMF network element, which comprises informing the RAN to cease a certain GBR data stream.

In some embodiments of the present disclosure, the step 58 may comprise that: the SMF network element informs the RAN side device to adjust the resources of the GBR streams and cease some up-link GBR data streams and/or down-link GBR data streams with a low priority according to the SM policy information.

In step 59, the step of establishing/modifying a PDU Session is completed (if the UE supports the function of limiting the slice session rate, the network side device sends the rate range of the up-link non-GBR data streams to the UE to use).

In the above-described embodiments of the present disclosure, in the case where the rate sum of the current up-link/down-link data streams might exceed the Slice-UL/DL-AMRR and there is a demand of a new GBR data stream, the PCF may inform the RAN side device to cease some GBR data streams with a low priority according to the ARP priority, to ensure that the rate sum of all the current up-link/down-link data streams will not exceed the Slice-UL/DL-AMRR; and the PCF then calculates the rate range of the up-link/down-link non-GBR data streams according to the same method as before and sends the rate range of the up-link/down-link non-GBR data streams to the UPF device to perform(an alternative solution is to send the rate range of the up-link non-GBR data streams to the UE to perform).

In the above-described embodiments of the present disclosure, it is provided to add two subscription parameters stored in the PCF (UDR) device: Slice-UL-AMBR and Slice-DL-AMBR, which represent the maximum up-link/down-link rate of the terminal in the network slice respectively.

In the above-described embodiments of the present disclosure, a rate limit on the GBR and non-GBR data streams of a user accessing the network slice of the 5G system is realized by storing, calculating and analyzing the corresponding subscription parameters, sending the rate limit information and performing the rate limit policy.

Figure 6:
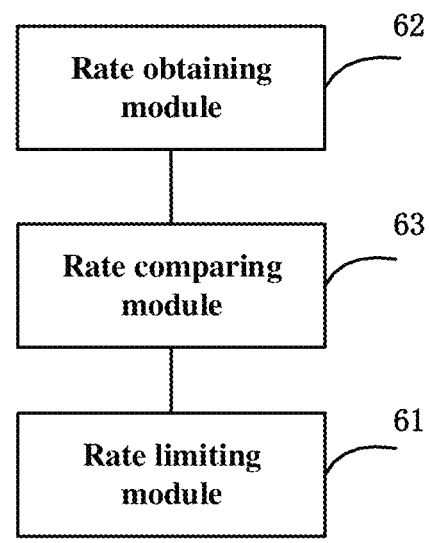
FIG. 6 is a schematic view of some embodiments of the policy control function network element of the present disclosure according to the present disclosure.

FIG. 6 is a schematic view of some embodiments of the policy control function network element of the present disclosure according to the present disclosure. As shown in FIG. 6, the policy control function network element of the present disclosure may comprise a rate limiting module 61.

The rate limiting module 61 is configured to perform a unified rate limit on a guaranteed bit rate (GBR) data stream and anon-guaranteed bit rate (non-GBR) data stream of the network slice user in case where a user equipment initiates a slice data session establishment request or a slice data session modification request.

In some embodiments of the present disclosure, the slice data session establishment request or the slice data session modification request may comprise a terminal capability identifier, wherein the terminal capability identifier is configured to indicate whether the user equipment supports the function of limiting a slice session rate of the non-GBR data stream.

In some embodiments of the present disclosure, as shown in FIG. 6, the policy control function network element of the present disclosure may further comprise a rate obtaining module 62 and a rate comparing module 63.

The rate obtaining module 62 is configured to obtain the rate sum of all current up-link data streams of a terminal activation state user plane in a network slice and the rate sum of all current down-link data streams of the terminal activation state user plane in the network slice in the case where the user equipment initiates (or sends) a slice data session establishment request or a slice data session modification request.

The rate comparing module 63 is configured to compare the rate sum of all the current up-link data streams with the maximum up-link rate of the terminal in the network slice, and compare the rate sum of all the current down-link data streams with the maximum down-link rate of the terminal in the network slice.

The rate limiting module 61 is configured to perform a unified rate limit on the GBR data stream and the non-GBR data stream of the network slice user according to the comparison results of the rate sum of all the current up-link data streams and the maximum up-link rate of the terminal in the network slice, and the rate sum of all the current down-link data streams and the maximum down-link rate of the terminal in the network slice.

In some embodiments of the present disclosure, the rate limiting module 61 may be configured to subtract the GBR rate sum of all the current up-link GBR data streams from the maximum up-link rate of the terminal as a rate range of up-link non-GBR data streams to get a first value, and take the first value, in the case where the rate sum of all the current up-link data streams is less than or equal to the maximum up-link rate of the terminal in the network slice and the rate sum of all the current down-link data streams is less than or equal to the maximum down-link rate of the terminal in the network slice; and send the rate range of the up-link non-GBR data streams through a session management function network element to a user equipment or a user plane function network element to perform.

In some embodiments of the present disclosure, the rate limiting module 61 may also be configured to subtract the GBR rate sum of all the current down-link GBR data streams from the maximum down-link rate of the terminal to get a second value, and take the second value as a rate range of up-link non-GBR data streams, in the case where the rate sum of all the current up-link data streams is less than or equal to the maximum up-link rate of the terminal in the network slice and the rate sum of all the current down-link data streams is less than or equal to the maximum down-link rate of the terminal in the network slice; and send the rate range of the down-link non-GBR data stream rates through the session management function network element to the user plane function network element to perform.

In some embodiments of the present disclosure, the rate limiting module 61 may also be configured to take an up-link GBR data stream with an address resolution protocol priority lower than a predetermined priority as an up-link GBR data stream required to be ceased in the case where the rate sum of all the current up-link data streams is greater than the maximum up-link rate of the terminal in the network slice and there is a new GBR data stream, to ensure that the rate sum of all the current up-link data streams is less than or equal to the maximum up-link rate of the terminal in the network slice; subtract the GBR rate sum of all the current up-link GBR data streams from the maximum down-link rate of the terminal to get a first value, and take the first value as a rate range of up-link non-GBR data streams; inform the wireless access network side device to cease the up-link GBR data stream with the address resolution protocol priority lower than the preset priority through a session management function network element; and send the rate range of the up-link non-GBR data streams through the session management function network element to a user equipment or a user plane function network element to perform.

In some embodiments of the present disclosure, the rate limiting module 61 is configured to send the rate range of the up-link non-GBR data streams to the session management function network element in the case where the session management function network element sends the rate range of the up-link non-GBR data streams to a user equipment or a user plane function network element to perform through a session management function network element, so that the session management function network element may determine whether the user equipment supports the function of limiting the slice session rate according to the terminal capability identifier, send the rate range of the up-link non-GBR data streams to the user equipment to perform in the case where the user equipment supports the function of limiting the slice session rate, and send the rate range of the up-link non-GBR data streams to the user plane function network element to perform in the case where the user equipment does not support the function of limiting the slice session rate.

In some embodiments of the present disclosure, the rate limiting module 61 may also be configured to take the down-link GBR data stream with an address resolution protocol priority lower than a predetermined priority as a down-link GBR data stream required to be ceased in the case where the rate sum of all the current down-link data streams is greater than the maximum down-link rate of the terminal in the network slice and there is a new GBR data stream, to ensure that the rate sum of all the current down-link data streams is less than or equal to the maximum down-link rate of the terminal in the network slice; subtract the GBR rate sum of all the current down-link GBR data streams from the maximum down-link rate of the terminal to get a second value, and take the second value as a rate range of down-link non-GBR data streams; inform wireless access network side device to cease the down-link GBR data stream with the address resolution protocol priority lower than the predetermined priority through a session management function network element; and send the rate range of the down-link non-GBR data streams through the session management function network element to a user plane function network element to perform.

In some embodiments of the present disclosure, the policy control function network element may be configured to perform the operation of implementing the method for limiting a data rate of a network slice user according to any one of the above-described embodiments (for example, any one of the embodiments in FIGS. 1 to 5).

Based on the policy control function network element provided in the above-described embodiments of the present disclosure, a rate limit on the GBR and non-GBR data streams of a user accessing the network slice of the 5G system is realized by storing, calculating and analyzing the corresponding subscription parameters, issuing the rate limit information and performing the rate limit policy.

In the above-described embodiments of the present disclosure, for the technical solution of limiting a rate of data connection established for a user accessing the network slice, it is necessary to consider that the GBR data stream therein ensures its required Guaranteed Bit Rate, and a rate upper limit range is mainly set for the non-GBR data stream.

The above-described embodiments of the present disclosure may be applied to all the scenarios of the data services of the 5G network slice.

Figure 7:
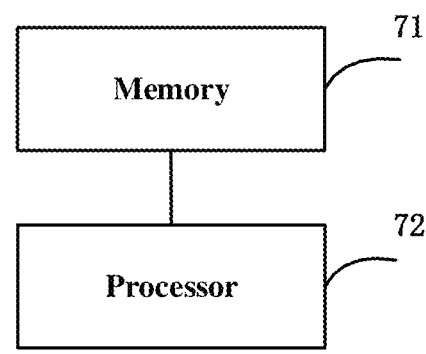
FIG. 7 is a schematic view of other embodiments of the policy control function network element according to the present disclosure.

FIG. 7 is a schematic view of other embodiments of the policy control function network element according to the present disclosure. As shown in FIG. 7, the policy control function network element of the present disclosure may comprise a memory 71 and a processor 72.

The memory 71 is configured to store instructions.

The processor 72 is configured to execute the instructions, so that the policy control function network element is configured to perform the operation of implementing the method for limiting a data rate of a network slice user according to any one of the above-described embodiments (for example, any one of the embodiments in FIGS. 1 to 5).

The above-described embodiments of the present disclosure are directed to a solution of limiting a user data rate in a network slice dimension. In the above-described embodiments of the present disclosure, a unified data rate limit on the GBR and non-GBR data streams of a network slice user is realized. When the 5G network slice is deployed in the future, the above-described embodiments of the present disclosure may optimize of the data streams in the 5G network slice.

According to another aspect of the present disclosure, a system for limiting a data rate of a network slice user is provided, which comprises the policy control function network element according to any one of the above-described embodiments (for example, the embodiments of FIGS. 6 to 7).

The embodiments of FIGS. 4 and 5 also provide schematic views of a system for limiting a data rate of a network slice user in some embodiments of the present disclosure. As shown in FIGS. 4 and 5, the system for limiting a data rate of a network slice user according to the present disclosure may comprise a policy control function network element (PCF) 1.

The policy control function network element 1 may be configured to perform a unified rate limit on a guaranteed bit rate (GBR) data stream and anon-guaranteed bit rate (non-GBR) data stream of the network slice user in the case where the user equipment initiates a slice data session establishment request or a slice data session modification request.

In some embodiments of the present disclosure, as shown in FIGS. 4 and 5, the policy control function network element (PCF) 1 may comprise a UDR.

In some embodiments of the present disclosure, the policy control function network element (PCF) 1 may be implemented as the policy control function network element according to any one of the above-described embodiments (for example, the embodiments of FIGS. 6 to 7).

In some embodiments of the present disclosure, as shown in FIGS. 4 and 5, the system for limiting a data rate of a network slice user may further comprise a session management function network element (SMF) 2.

The session management function network element 2 may be configured to request a session management policy from the policy control function network element in the case where a user equipment initiates the slice data session establishment request or the slice data session modification request; receive the session management policy sent by the policy control function network element, wherein the session management policy comprises a rate range of up-link non-GBR data streams, a rate range of down-link non-GBR data streams, and a ceasing instruction of a down-link GBR data stream or an up-link GBR data stream; send the rate range of the up-link non-GBR data streams to a user equipment or a user plane function network element to perform; send the rate range of the down-link non-GBR data streams to the user plane function network element to perform; and inform a wireless access network side device to cease the up-link GBR data stream or the down-link GBR data stream with an address resolution protocol priority lower than a predetermined priority.

In some embodiments of the present disclosure, as shown in FIGS. 4 and 5, the system for limiting a data rate of a network slice user may further comprise a user equipment (UE) 3.

The user equipment 3 may be configured to send the slice data session establishment request or the slice data session modification request, wherein the slice data session establishment request or the slice data session modification request comprises a terminal capability identifier configured to indicate whether the user equipment supports a function of limiting a slice session rate of the non-GBR data stream; and perform a rate range of up-link non-GBR data streams sent by the session management function network element 2.

In some embodiments of the present disclosure, as shown in FIGS. 4 and 5, the system for limiting a data rate of a network slice user may further comprise a user plane function network element (UPF) 4.

The user plane function network element 4 may be configured to perform the rate range of the up-link non-GBR data streams and/or the rate range of the down-link non-GBR data streams sent by the session management function network element 2.

In some embodiments of the present disclosure, as shown in FIGS. 4 and 5, the system for limiting a data rate of a network slice user may further comprise an access and mobility management function network element (AMF) 5.

The access and mobility management function network element 5 may be configured to send a Create/Update Session Management Context Request to the SMF network element in the case where the slice data PDU session establishment request or the slice data PDU session modification request sent by the user equipment 3 is received.

In some embodiments of the present disclosure, as shown in FIG. 5, the system for limiting a data rate of a network slice user may further comprise a radio access network (RAN) 6.

The radio access network 6 may be configured to adjust the resources of the GBR streams and cease some up-link GBR data streams and/or down-link GBR data streams with a low priority according to the notification of the SMF network element.

Based on the system for limiting a data rate of a network slice user provided by the above-described embodiments of the present disclosure, it is only necessary to update the software while the hardware is not changed. When the 5G network slice is deployed in the future, the above-described embodiments of the disclosure may improve the transmission efficiency of the GBR and non-GBR data streams and optimize the resource utilization rate of the 5G network slice.

According to another aspect of the present disclosure, a computer-readable storage medium is provided, wherein the computer-readable storage medium has computer instructions stored thereon that, when executed by a processor, perform the method for limiting a data rate of a network slice user according to any one of the above-described embodiments (for example, any one of the embodiments in FIGS. 1 to 5).

Based on the computer-readable storage medium provided by the above-described embodiments of the present disclosure, it is possible to limit a user data rate directed to a network slice dimension, to realize a unified rate limit on the GBR and non-GBR data streams of the network slice equipment, which is conductive to a reasonable allocation of the network slice resources and an optimized transmission efficiency of the data streams in the network slice.

The policy control function network element, the session management function network element and the user equipment described above may be implemented as a general purpose processor, a programmable logic controller (PLC), a digital signal processor (DSP), an application specific integrated circuit (ASIC), a field-programmable gate array (FPGA) or other programmable logic devices, discrete gates or transistor logic devices, discrete hardware assemblies or any proper combination thereof, which is configured to perform the functions described in the present application.

Hitherto, the present disclosure has been described in detail. Some details well known in the art are not described in order to avoid obscuring the concept of the present disclosure. According to the above description, those skilled in the art would fully understand how to implement the technical solutions disclosed here.

Those of ordinary skill in the art may understand that all or some of the steps in the above-described embodiments may be accomplished by hardware, or by programs to instruct relevant hardware. The programs may be stored in a computer-readable storage medium. The storage medium as mentioned above may be read-only memory, magnetic disk or optical disk, and the like.

Descriptions of the present disclosure, which are made for purpose of exemplification and description, are not absent with omissions or limit the present disclosure to the forms as disclosed. Many modifications and variations are apparent for those skilled in the art. The embodiments are selected and described in order to better explain the principles and actual application of the present disclosure, and enable those skilled in the art to understand the present disclosure to design various embodiments adapted to particular purposes and comprising various modifications.

What is claimed is:

1. A method for limiting a data rate of a network slice user, comprising:

performing, by a policy control function network element, a unified rate limit on a guaranteed bit rate (GBR) data stream and a non-guaranteed bit rate (non-GBR) data stream of the network slice user in case where a user equipment initiates a slice data session establishment request or a slice data session modification request, wherein the performing, by a policy control function network element, a unified rate limit on a GBR data stream and a non-GBR data stream of the network slice user, comprises:

subtracting, by the policy control function network element, the GBR rate sum of all the current up-link GBR data streams from the maximum up-link rate of a terminal to get a first value, and taking the first value as a rate range of up-link non-GBR data streams, in the case where the rate sum of all the current up-link data streams is less than or equal to the maximum up-link rate of the terminal in the network slice and the rate sum of all the current down-link data streams is less than or equal to the maximum down-link rate of the terminal in the network slice; and sending, by the policy control function network element, the rate range of the up-link non-GBR data streams through a session management function network element to a user equipment or a user plane function network element to perform.

2. The method for limiting a data rate of a network slice user according to claim 1, wherein the performing, by a policy control function network element, a unified rate limit on a GBR data stream and a non-GBR data stream of the network slice user, comprises:

obtaining, by the policy control function network element, the rate sum of all current up-link data streams of a terminal activation state user plane in a network slice and the rate sum of all current down-link data streams of the terminal activation state user plane in the network slice;

comparing, by the policy control function network element, the rate sum of all the current up-link data streams with the maximum up-link rate of the terminal in the network slice, and comparing the rate sum of all the current down-link data streams with the maximum down-link rate of a terminal in the network slice; and performing, by the policy control function network element, the unified rate limit on the GBR data stream and the non-GBR data stream of the network slice user according to the comparison results of the rate sum of all the current up-link data streams and the maximum up-link rate of the terminal in the network slice, and the rate sum of all the current down-link data streams and the maximum down-link rate of the terminal in the network slice.

3. The method for limiting a data rate of a network slice user according to claim 1, wherein the performing, by a policy control function network element, a unified rate limit on a GBR data stream and a non-GBR data stream of the network slice user, comprises:

subtracting, by the policy control function network element, the GBR rate sum of all the current down-link GBR data streams from the maximum down-link rate of the terminal to get a second value, and taking the second value as a rate range of up-link non-GBR data streams, in the case where the rate sum of all the current up-link data streams is less than or equal to the maximum up-link rate of the terminal in the network slice and the rate sum of all the current down-link data streams is less than or equal to the maximum down-link rate of the terminal in the network slice; and sending, by the policy control function network element, the rate range of the down-link non-GBR data stream rates through the session management function network element to the user plane function network element to perform.

4. A method for limiting a data rate of a network slice user, comprising:

performing, by a policy control function network element, a unified rate limit on a guaranteed bit rate (GBR) data stream and a non-guaranteed bit rate (non-GBR) data stream of the network slice user in case where a user equipment initiates a slice data session establishment request or a slice data session modification request, wherein the performing, by a policy control function network element, a unified rate limit on a GBR data stream and a non-GBR data stream of the network slice user, comprises:

taking, by the policy control function network element, an up-link GBR data stream with an address resolution protocol priority lower than a predetermined priority as an up-link GBR data stream required to be ceased in the case where the rate sum of all the current up-link data streams is greater than the maximum up-link rate of the terminal in the network slice and there is a new GBR data stream, to ensure that the rate sum of all the current up-link data streams is less than or equal to the maximum up-link rate of the terminal in the network slice;

subtracting, by the policy control function network element, the GBR rate sum of all the current up-link GBR data streams from the maximum down-link rate of the terminal to get a first value, and taking the first value as a rate range of up-link non-GBR data streams;

informing, by the policy control function network element, a wireless access network side device to cease the up-link GBR data stream with the address resolution protocol priority lower than the preset priority through a session management function network element; and sending, by the policy control function network element, the rate range of the up-link non-GBR data streams through the session management function network element to a user equipment or a user plane function network element to perform.

5. The method for limiting a data rate of a network slice user according to claim 4, wherein:

the slice data session establishment request or the slice data session modification request comprises a terminal capability identifier, wherein the terminal capability identifier is configured to indicate whether the user equipment supports a function of limiting a slice session rate of the non-GBR data stream; and the sending, by the policy control function network element, the rate range of the up-link non-GBR data streams to a user equipment or a user plane function network element to perform through a session management function network element comprises: sending, by the policy control function network element, the rate range of the up-link non-GBR data streams to the session management function network element, wherein the session management function network element is configured to determine whether the user equipment supports the function of limiting the slice session rate according to the terminal capability identifier, send the rate range of the up-link non-GBR data streams to the user equipment to perform in the case where the user equipment supports the function of limiting the slice session rate, and send the rate range of the up-link non-GBR data streams to the user plane function network element to perform in the case where the user equipment does not support the function of limiting the slice session rate.

6. A method for limiting a data rate of a network slice user, comprising:

performing, by a policy control function network element, a unified rate limit on a guaranteed bit rate (GBR) data stream and a non-guaranteed bit rate (non-GBR) data stream of the network slice user in case where a user equipment initiates a slice data session establishment request or a slice data session modification request, wherein the performing, by a policy control function network element, a unified rate limit on a GBR data stream and a non-GBR data stream of the network slice user, comprises:

taking, by the policy control function network element, a down-link GBR data stream with an address resolution protocol priority lower than a predetermined priority as a down-link GBR data stream required to be ceased in the case where the rate sum of all the current down-link data streams is greater than the maximum down-link rate of the terminal in the network slice and there is a new GBR data stream, to ensure that the rate sum of all the current down-link data streams is less than or equal to the maximum down-link rate of the terminal in the network slice;

subtracting, by the policy control function network element, the GBR rate sum of all the current down-link GBR data streams from the maximum down-link rate of the terminal to get a second value, and taking the second value as a rate range of down-link non-GBR data streams;

informing, by the policy control function network element, a wireless access network side device to cease the downlink GBR data stream with the address resolution protocol priority lower than the predetermined priority through a session management function network element; and sending, by the policy control function network element, the rate range of the down-link non-GBR data streams through the session management function network element to a user plane function network element to perform.

7. A policy control function network element, comprising:
a memory configured to store instructions; and
a processor configured to execute the instructions, so that the policy control function network element is configured to perform the method for limiting a data rate of a network slice user according to claim 1.

8. A system for limiting a data rate of a network slice user, comprising the policy control function network element according to claim 7.

9. The system for limiting a data rate of a network slice user according to claim 8, further comprising:
a session management function network element configured to request a session management policy from the policy control function network element in the case where a user equipment initiates the slice data session establishment request or the slice data session modification request; receive the session management policy sent by the policy control function network element, wherein the session management policy comprises a rate range of up-link non-GBR data streams, a rate range of down-link non-GBR data streams, and a ceasing instruction of a down-link GBR data stream or an up-link GBR data stream; send the rate range of the up-link non-GBR data streams to a user equipment or a user plane function network element to perform; send the rate range of the down-link non-GBR data streams to the user plane function network element to perform; and inform a wireless access network side device to cease the up-link GBR data stream or the down-link GBR data stream with an address resolution protocol priority lower than a predetermined priority.

10. The system for limiting a data rate of a network slice user according to claim 8, further comprising:
a user equipment configured to send the slice data session establishment request or the slice data session modification request, wherein the slice data session establishment request or the slice data session modification request comprises a terminal capability identifier configured to indicate whether the user equipment supports a function of limiting a slice session rate of the non-GBR data stream; and perform a rate range of up-link non-GBR data streams.

11. The system for limiting a data rate of a network slice user according to claim 8, further comprising:
a user plane function network element configured to perform at least one of a rate range of up-link non-GBR data streams or a rate range of down-link non-GBR data streams.

12. The policy control function network element according to claim 7, wherein the performing a unified rate limit on a GBR data stream and a non-GBR data stream of the network slice user comprises:
obtaining the rate sum of all current up-link data streams of a terminal activation state user plane in a network slice and the rate sum of all current down-link data streams of the terminal activation state user plane in the network slice;
comparing the rate sum of all the current up-link data streams with the maximum up-link rate of a terminal in the network slice, and comparing the rate sum of all the current down-link data streams with the maximum down-link rate of a terminal in the network slice; and
performing the unified rate limit on the GBR data stream and the non-GBR data stream of the network slice user according to the comparison results of the rate sum of all the current up-link data streams and the maximum up-link rate of the terminal in the network slice, and the rate sum of all the current down-link data streams and the maximum down-link rate of the terminal in the network slice.

13. The policy control function network element according to claim 7, wherein the performing, by the policy control function network element, the unified rate limit on the GBR data stream and the non-GBR data stream of the network slice user according to the comparison results of the rate sum of all the current up-link data streams and the maximum up-link rate of the terminal in the network slice, and the rate sum of all the current down-link data streams and the maximum down-link rate of the terminal in the network slice, further comprises:
subtracting, by the policy control function network element, the GBR rate sum of all the current down-link GBR data streams from the maximum down-link rate of the terminal to get a second value, and taking the second value as a rate range of up-link non-GBR data streams, in the case where the rate sum of all the current up-link data streams is less than or equal to the maximum up-link rate of the terminal in the network slice and the rate sum of all the current down-link data streams is less than or equal to the maximum down-link rate of the terminal in the network slice; and
sending, by the policy control function network element, the rate range of the down-link non-GBR data stream rates through the session management function network element to the user plane function network element to perform.

14. A non-transitory computer-readable storage medium, wherein the non-transitory computer-readable storage medium has computer instructions stored thereon that, when executed by a processor, implements the method for limiting a data rate of a network slice user according to claim 1.

15. A policy control function network element, comprising:
a memory configured to store instructions; and
a processor configured to execute the instructions, so that the policy control function network element is configured to perform the method for limiting a data rate of a network slice user according to claim 4.

16. A system for limiting a data rate of a network slice user, comprising the policy control function network element according to claim 15.

17. A policy control function network element, comprising:
a memory configured to store instructions; and
a processor configured to execute the instructions, so that the policy control function network element is configured to perform the method for limiting a data rate of a network slice user according to claim 6.

* * * * *